(12) United States Patent
Loval et al.

(10) Patent No.: US 12,313,003 B2
(45) Date of Patent: May 27, 2025

(54) FUEL DISTRIBUTION ASSEMBLY FOR A TURBOMACHINE

(71) Applicant: SAFRAN AIRCRAFT ENGINES, Paris (FR)

(72) Inventors: Sébastien Christophe Loval, Moissy-Cramayel (FR); Pierre Jean-Baptiste Metge, Moissy-Cramayel (FR); Alexandre Corsaut, Moissy-Cramayel (FR); Kevin Auber, Moissy-Cramayel (FR); Marc Serrau, Moissy-Cramayel (FR); Sébastien Jahin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/716,550

(22) PCT Filed: Dec. 4, 2022

(86) PCT No.: PCT/FR2022/052240
§ 371 (c)(1),
(2) Date: Jun. 5, 2024

(87) PCT Pub. No.: WO2023/105146
PCT Pub. Date: Jun. 15, 2023

(65) Prior Publication Data
US 2025/0043728 A1 Feb. 6, 2025

(30) Foreign Application Priority Data
Dec. 9, 2021 (FR) ...................................... 2113214

(51) Int. Cl.
*F02C 7/22* (2006.01)

(52) U.S. Cl.
CPC .................................... *F02C 7/222* (2013.01)

(58) Field of Classification Search
CPC .................................. F02C 7/22; F02C 7/222
See application file for complete search history.

(56) References Cited

U.S. PATENT DOCUMENTS 10,513,983 B2 12/2019 Butcher et al.
12,078,354 B1 * 9/2024 Ozog ........................ F02C 3/22
(Continued)

FOREIGN PATENT DOCUMENTS

FR 2832760 A1 5/2003

OTHER PUBLICATIONS

International Search Report and Written Opinion in corresponding International Patent Application No. PCT/FR2022/052240, mailed Mar. 20, 2023, 2 pages, English Translation.

*Primary Examiner* — William H Rodriguez
(74) *Attorney, Agent, or Firm* — Cozen O'Connor

(57) ABSTRACT

A fuel distribution assembly for a turbomachine extends between a first interface plane and a second interface plane substantially parallel to the first interface plane, the distribution assembly including a plurality of distribution ducts, each duct having at least one inlet portion that is open to the first interface plane or to the second interface plane, at least one outlet portion that is open to the first interface plane or to the second interface plane, and a middle portion fluidly connecting each inlet portion of the duct and each outlet portion of the duct. The middle portion of each duct has an internal cross-section of substantially elliptical shape.

19 Claims, 3 Drawing Sheets

(56) References Cited

U.S. PATENT DOCUMENTS

| | | | |
|---|---|---|---|
| 2018/0087701 A1 | 3/2018 | Adriany et al. | |
| 2020/0095937 A1* | 3/2020 | Broome | B05B 1/02 |
| 2020/0309287 A1* | 10/2020 | Grover | F16L 9/19 |
| 2023/0118241 A1* | 4/2023 | Verma | F16L 3/10 |
| | | | 248/636 |
| 2024/0218833 A1* | 7/2024 | Garcia Arellano | F23R 3/60 |

* cited by examiner

FUEL DISTRIBUTION ASSEMBLY FOR A TURBOMACHINE

CROSS-REFERENCE TO RELATED APPLICATIONS

This application is a US National phase Application of PCT/FR2022/052240 filed Dec. 4, 2022, which claims priority to French Patent Application No. 2113214 filed Dec. 9, 2021, both of which are hereby incorporated in their entirety.

TECHNICAL FIELD OF THE INVENTION

The invention relates to a fuel distribution assembly for a turbomachine.

BACKGROUND

Supplying a turbomachine with fuel, for example kerosene, requires distributing this fuel between a large number of inlets and outlets in order to supply the multiple nozzles of the combustion chamber.

To do so, a turbomachine comprises a distribution assembly comprising a plurality of fuel distribution ducts, in order to carry out this complex supplying of fuel.

Previous fuel supply systems, comprising separate supply tube assemblies obtained by machining or lost-wax casting, lack compactness and are very complex and expensive to manufacture.

Existing systems take the form of a compact plate inserted between power connectors and the motor block, implemented by superimposing machined plates that are assembled together by diffusion welding.

FIG. 1 is an exploded view of such a distribution assembly 1, comprising six machined metal plates 3, superimposed in a stacking direction X, and fixed to each other by diffusion welding. Clamping members are added in orifices 5 through the stack, to improve retention.

Ducts 7 are defined by elongate channels in a plate 3 and the stacked edges of two neighboring plates 3.

FIG. 2 is a section view of distribution assembly 1, which shows the internal cross-section of ducts 7 obtained with this manufacturing method, said cross-section having a substantially rectangular shape.

Such a rectangular cross-section is not optimal for the flow of liquids, because the corners of the rectangle form areas of low speed which contribute very little to the overall flow rate. It is also possible for ducts 7 to be deformed during assembly of plates 3. The assembly pressure exerted in the stacking direction X causes a bulging of the upper and lower faces 9 of ducts 7, which gives them a slightly convex shape that is even less fluidly efficient than a simple rectangle.

In addition, the bends of ducts 7 in the stacking direction X are 90° bends, obtained by aligning a drilled hole with a duct 7 of a neighboring plate 3. These bends cause significant pressure losses.

Finally, the obtained distribution assembly 1 is massive and heavy, and its manufacture is expensive because of the large number of operations required.

PRESENTATION OF THE INVENTION

The invention aims to remedy these disadvantages by providing a fuel distribution assembly that is light and simple to manufacture, and in which the flow of fuel is facilitated.

To this end, an object of the invention is a fuel distribution assembly for a turbomachine, the distribution assembly extending between a first interface plane and a second interface plane substantially parallel to the first interface plane, the distribution assembly comprising a plurality of distribution ducts, each duct comprising:

at least one inlet portion that is open to the first interface plane or to the second interface plane, at least one outlet portion that is open to the first interface plane or to the second interface plane, and a middle portion fluidly connecting each inlet portion of the duct and each outlet portion of the duct, characterized in that the middle portion of each duct has an internal cross-section of substantially elliptical shape.

Such a distribution assembly makes it possible to have an increased effective hydraulic diameter for each duct, without changing the cross-sectional area. The distribution assembly is manufactured using an additive manufacturing process. In fact, the additive manufacturing process allows obtaining such a geometry. The distribution assembly also has a reduced mass, and can be manufactured in a simple, reliable, and inexpensive manner due to the additive manufacturing.

The middle portion of the ducts may also have an elliptical external cross-section.

The internal cross-section and the external cross-section are taken in a section plane that is perpendicular to a direction of local extension of the duct.

The ellipse of the internal cross-section and/or of the external cross-section of the middle portion of each duct is notably non-circular, i.e. it has a non-zero eccentricity.

The distribution assembly may comprise a support plate interconnecting the middle portions of the ducts, the support plate extending along a midplane substantially parallel to the first interface plane and to the second interface plane.

Such a feature allows maintaining the ducts during the manufacturing of the distribution assembly by additive manufacturing, and improves the resistance of the assembly to vibrations during operation of the turbomachine.

The midplane may be equidistant from the first interface plane and the second interface plane.

Such a feature improves the stability and the vibration resistance of the distribution assembly. The support plate may have a thickness, measured perpendicularly to the midplane, of between 1 mm and 2 mm.

Such a feature allows a good compromise between the mechanical resistance of the distribution assembly and its mass.

The distribution assembly may comprise at least one stiffening rib extending on the support plate, projecting from the support plate in a direction perpendicular to the midplane.

Such ribs improve the strength of the plate, particularly the bending strength in the midplane. The distribution assembly may comprise at least one embedding portion which extends as a projection from the support plate to the first interface plane, each embedding portion comprising at least one peripheral surface forming a clearance angle with the first interface plane, in a section plane perpendicular to said first interface plane, the clearance angle being between 30° and 60°.

Such a feature facilitates the installation and centering of the distribution assembly, as well as its dismantling and removal.

The inlet portion and/or the outlet portion of each duct may have an internal cross-section in the shape of a teardrop.

Such a feature makes it possible to avoid pressure loss at the inlets and/or outlets due to the sudden change in cross-section, without extending beyond a support region for seals at the interface.

Shape of a teardrop is understood to mean a shape composed of the superposition of a circle and of a triangle having two sides tangent to the circle, the vertex formed by said two sides being rounded.

The plurality of ducts may comprise between eight and twelve ducts.

The invention also relates to a method for manufacturing a distribution assembly as above, in which the distribution assembly is manufactured as one piece by an additive manufacturing process using laser powder bed fusion.

Such a method makes it possible to manufacture the assembly quickly and reliably, and allows obtaining a distribution assembly having one or more of the aforementioned features.

During the manufacture of the distribution assembly, the midplane may be oriented vertically in a tank containing the metal powder, so that the support plate acts to support the ducts during manufacturing.

DETAILED DESCRIPTION OF THE INVENTION

Figure 1:
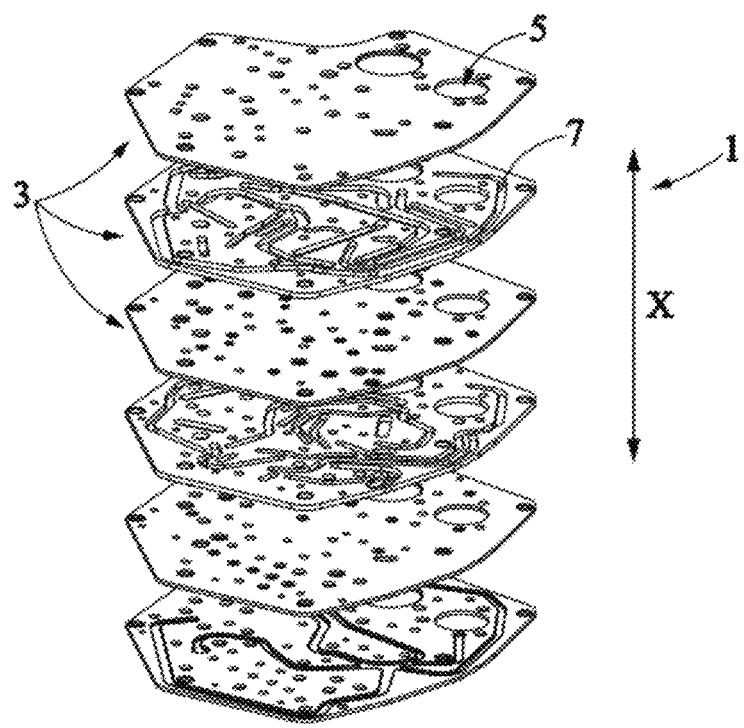
FIG. 1 is an exploded view of a known fuel distribution assembly of the prior art.
Figure 2:
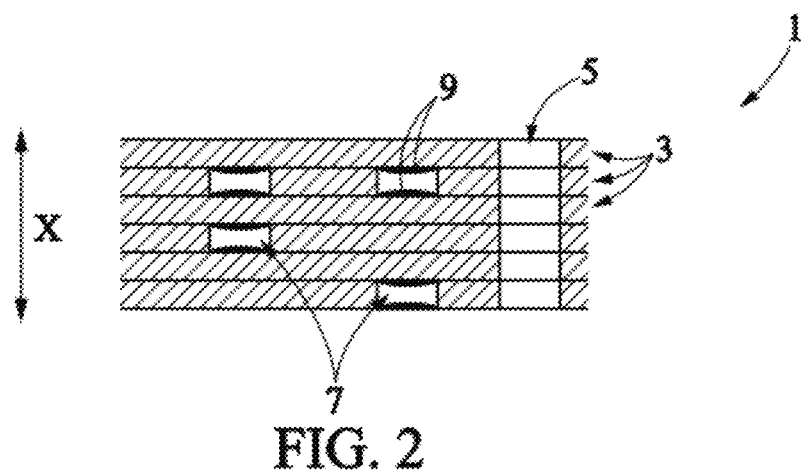
FIG. 2 is a cross-section view of the distribution assembly of FIG. 1.
Figure 3:
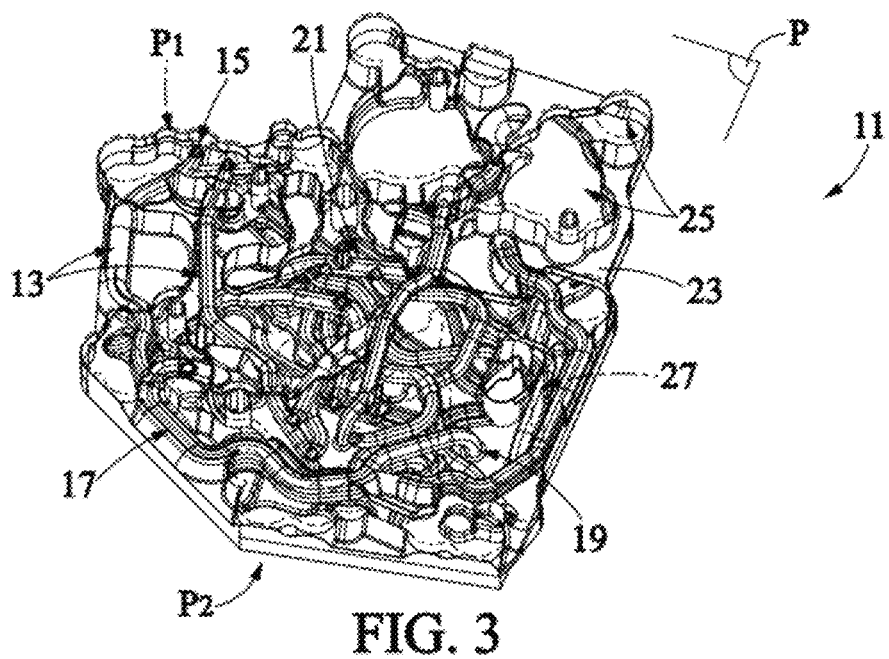
FIG. 3 is a perspective view of a distribution assembly according to the invention.

A distribution assembly 11 according to the invention is shown in FIG. 3. Assembly 11 is made as one piece, all of its metal components being integral with each other.

Assembly 11 extends between a first interface plane P1 and a second interface plane P2 which are parallel to each other. First interface plane P1 and second interface plane P2 comprise the surfaces where assembly 11 is in mechanical and fluidic contact with the other elements of the turbomachine to which assembly 11 distributes fuel.

Assembly 11 comprises a plurality of fuel distribution ducts 13 running between first interface plane P1 and second interface plane P2.

Each duct 13 comprises at least one inlet portion 15, a middle portion 17, and at least one outlet portion 19.

In the case where duct 13 comprises several inlet portions 15 or several outlet portions 19, duct 13 also comprises at least one branch 21, for example a T-branch.

Each inlet portion 15 and each outlet portion 19 is open to first interface plane P1 or to second interface plane P2.

Inlet portion 15 and outlet portion 19 of each duct 13 may be open to the same interface plane P1, P2, or to interface planes P1, P2 that are different from one another, depending on the requirements for fuel distribution.

Middle portion 17 extends between each inlet portion 15 and each outlet portion 19.

Distribution assembly 11 comprises a support plate 23 interconnecting middle portions 17 of the ducts, as well as embedding portions 25 and stiffening ribs 27 borne by support plate 23. Support plate 23 is substantially flat and extends along a midplane P. Midplane P is for example parallel to first and second interface planes P1, P2, and is for example equidistant from first and second interface planes P1, P2.

Embedding portions 25 are projecting parts extending from support plate 23 to first interface plane P1 or to second interface plane P2, in a direction perpendicular to midplane P.

Each embedding portion 25 has a flat top inscribed in first interface plane P1 or in second interface plane P2, and does not protrude beyond said interface plane.

Embedding portions 25 are intended to come to bear, in first interface plane P1 or in second interface plane P2, against the elements of the turbomachine to which distribution assembly 11 is fixed, and to embed in housings provided for this purpose, in order to block the movements of distribution assembly 11 in directions parallel to first interface plane P1 or to second interface plane 2 respectively.

Stiffening ribs 27 are elongate parts extending along support plate 23, projecting from support plate 23 in a direction perpendicular to midplane P.

Stiffening ribs 27 are for example substantially rectilinear parallel to midplane P, or have a curvature parallel to midplane P.

Stiffening ribs 27 increase the flexural rigidity of distribution assembly 11 and improve its resistance to vibrations.

Figure 4:
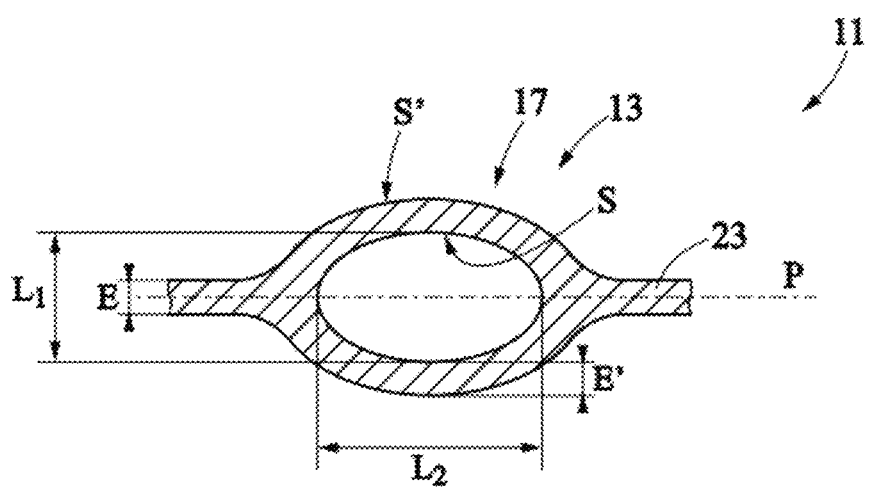
FIG. 4 is a cross-section view of a middle portion of a duct of the assembly of FIG. 3.

The cross-section of middle portion 17 of ducts 13 is shown in FIG. 4.

Middle portion 17 has an internal cross-section S of elliptical shape. The internal cross-section S is the cross-section of the inside hole of duct 13, in a section plane orthogonal to a direction of local extension of duct 13.

The internal cross-section S of elliptical shape gives duct 13 a greater effective fluidic cross-section compared to a rectangular cross-section, at a constant internal cross-sectional area. Middle portion 17 of duct 13 comprises connections to support plate 23, said walls having a substantially elliptical external cross-section S'. Support plate 23 is in particular made as one piece with the walls of duct 13.

The internal cross-section S and the external cross-section S' are centered on midplane P, which is a plane of symmetry for them.

The internal cross-section S has a minor axis length L1, measured perpendicularly to midplane P, of between 2 mm and 5 mm, and a major axis length L2, measured in midplane P, of between 4 mm and 7 mm.

Support plate 23 has a thickness E, measured perpendicularly to midplane P, of between 1 mm and 2 mm.

The walls of duct 13 have a thickness E', measured perpendicularly to midplane P, for example of between 0.5 mm and 1.5 mm.

The elliptical internal cross-section S has, at its lateral ends, a radius of curvature of between 1 mm and 1.5 mm.

Figure 5:
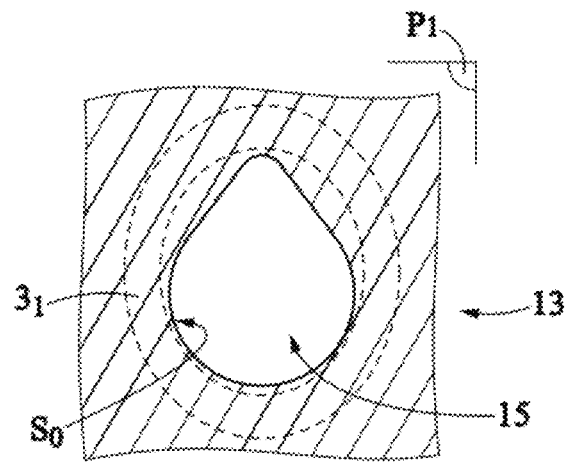
FIG. 5 is a cross-section view of an inlet portion of the duct of FIG. 4.

FIG. 5 is a section view of inlet portion 15 of one of ducts 13, in first interface plane P1.

As shown in FIG. 5, inlet portion 15 of each duct 13, as well as outlet portion 19, has an internal cross-section S0 in the shape of a teardrop in interface plane P1, P2.

Shape of a teardrop is understood to mean a shape composed of the superposition of a circle and of a triangle having two sides tangent to the circle, the vertex formed by said two sides being rounded.

This internal cross-section S0 is inscribed within a support region 31 for interface seals, this region having a circular ring shape. Support region 31 is intended to receive an O-ring ensuring the sealing of the interface between distribution assembly 11 and the rest of the turbomachine. The transition from an internal cross-section S of elliptical shape for middle portion 17 to a teardrop cross-section S0 for inlet 15 and outlet 19 portions makes it possible to avoid pressure losses, without extending beyond support region 31.

Figure 6:
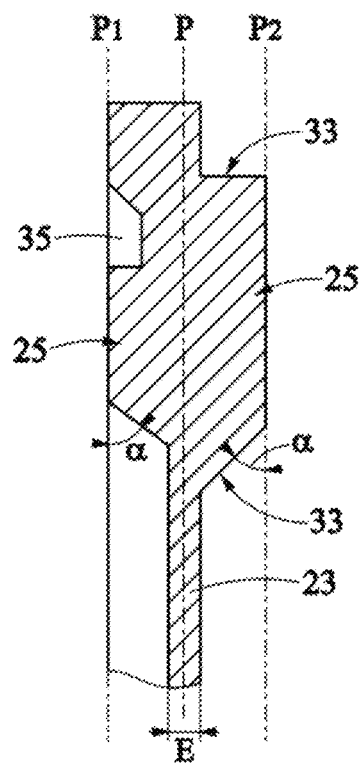
FIG. 6 is a longitudinal section view of an embedding portion of the assembly of FIG. 3.

FIG. 6 shows embedding portions 25 in a section view in a plane perpendicular to midplane P. As shown, each embedding portion 25 comprises at least peripheral surfaces 33 extending from support plate 23 to interface plane P1, P2.

At least one of peripheral surfaces 33 of each embedding portion 25 forms a clearance angle α with interface plane P1, P2, in the section plane perpendicular to interface plane P1, P2, the clearance angle α being between 30° and 60°, for example substantially equal to 45°.

In the example shown, only one of lateral surfaces 33 of each embedding portion 25 defines such a clearance angle α, the other lateral surfaces 33 of each embedding portion 25 extending perpendicularly to interface plane P1, P2.

Such a value for clearance angle α facilitates the installation and centering of the distribution assembly, as well as its dismantling and removal, compared to right angles. It is also simpler to produce when using additive manufacturing.

Distribution assembly 11 may also comprise one or more grooves 35 each open to one of the interface planes P1, P2 and running along the distribution assembly, intended to receive cables extending along distribution assembly 11.

The method for manufacturing the distribution assembly follows an additive manufacturing process using laser powder bed fusion. Such a process, known from the state of the art, is required in order to obtain distribution assembly 11 described above.

It is also reliable and fast, offering a very low rejection rate for the manufactured distribution assemblies 11, and allows a reduction in the mass, bulk, and manufacturing cost of said assembly.

During the manufacturing of distribution assembly 11, midplane P is oriented vertically in a tank containing the metal powder, so that support plate 23 acts to support ducts 13 during manufacturing.

The invention claimed is:

1. A fuel distribution assembly (11) for a turbomachine, the distribution assembly (11) extending between a first interface plane (P1) and a second interface plane (P2) substantially parallel to the first interface plane (P1), the distribution assembly (11) comprising a plurality of distribution ducts (13), each duct (13) comprising:
   at least one inlet portion (15) that is open to the first interface plane (P1) or to the second interface plane (P2),
   at least one outlet portion (19) that is open to the first interface plane (P1) or to the second interface plane (P2), and
   a middle portion (17) fluidly connecting each inlet portion (15) of the duct (13) and each outlet portion (19) of the duct (13),
   characterized in that the middle portion (17) of each duct (13) has an internal cross-section(S) of substantially elliptical shape,
   wherein the distribution assembly (11) comprises a support plate (23) interconnecting the middle portions (17) of the ducts (13), the support plate (23) extending along a midplane (P) substantially parallel to the first interface plane (P1) and to the second interface plane (P2).

2. The distribution assembly (11) according to claim 1, wherein the midplane (P) is equidistant from the first interface plane (P1) and the second interface plane (P2).

3. The distribution assembly (11) according to claim 1, wherein the support plate (23) has a thickness (E), measured perpendicularly to the midplane (P), of between 1 mm and 2 mm.

4. The distribution assembly (11) according to claim 1, wherein the distribution assembly (11) comprises at least one stiffening rib (27) extending on the support plate (23), projecting from the support plate (23) in a direction perpendicular to the midplane (P).

5. The distribution assembly (11) according to claim 1, wherein the distribution assembly (11) comprises at least one embedding portion (25) which extends as a projection from the support plate (23) to the first interface plane (P1), each embedding portion (25) comprising at least one peripheral surface (33) forming a clearance angle (α) with the first interface plane (P1), in a section plane perpendicular to said first interface plane (P1), the clearance angle (α) being between 30° and 60°.

6. The distribution assembly (11) according to claim 1, wherein the inlet portion (15) and/or the outlet portion (17) of each duct has an internal cross-section (S0) in the shape of a teardrop.

7. The distribution assembly (11) according to claim 1, wherein the plurality of ducts (13) comprises between eight and twelve ducts.

8. A method for manufacturing a distribution assembly (11) according to claim 1, wherein the distribution assembly (11) is manufactured as one piece by an additive manufacturing process using laser powder bed fusion.

9. The distribution assembly (11) according to claim 2, wherein the support plate (23) has a thickness (E), measured perpendicularly to the midplane (P), of between 1 mm and 2 mm.

10. The distribution assembly (11) according to claim 2, wherein the distribution assembly (11) comprises at least one stiffening rib (27) extending on the support plate (23), projecting from the support plate (23) in a direction perpendicular to the midplane (P).

11. The distribution assembly (11) according to claim 2, wherein the distribution assembly (11) comprises at least one embedding portion (25) which extends as a projection from the support plate (23) to the first interface plane (P1), each embedding portion (25) comprising at least one peripheral surface (33) forming a clearance angle (α) with the first interface plane (P1), in a section plane perpendicular to said first interface plane (P1), the clearance angle (α) being between 30° and 60°.

12. The distribution assembly (11) according to claim 2, wherein the inlet portion (15) and/or the outlet portion (17) of each duct has an internal cross-section (S0) in the shape of a teardrop.

13. The distribution assembly (11) according to claim 2, wherein the plurality of ducts (13) comprises between eight and twelve ducts.

14. A method for manufacturing a distribution assembly (11) according to claim 2, wherein the distribution assembly (11) is manufactured as one piece by an additive manufacturing process using laser powder bed fusion.

15. A method for manufacturing a distribution assembly (11) according to claim 3, wherein the distribution assembly (11) is manufactured as one piece by an additive manufacturing process using laser powder bed fusion.

16. A method for manufacturing a distribution assembly (11) according to claim 4, wherein the distribution assembly (11) is manufactured as one piece by an additive manufacturing process using laser powder bed fusion.

17. A method for manufacturing a distribution assembly (11) according to claim 5, wherein the distribution assembly (11) is manufactured as one piece by an additive manufacturing process using laser powder bed fusion.

18. A method for manufacturing a distribution assembly (11) according to claim 6, wherein the distribution assembly (11) is manufactured as one piece by an additive manufacturing process using laser powder bed fusion.

19. A method for manufacturing a distribution assembly (11) according to claim 7, wherein the distribution assembly (11) is manufactured as one piece by an additive manufacturing process using laser powder bed fusion.

* * * * *